Feb. 8, 1949. F. R. BECK 2,461,025
FIXTURE ACCOMMODATING AND HANGER STUD
Filed Oct. 28, 1944

Frederick R. Beck.
INVENTOR.

BY Clarence A. O'Brien
and Harvey B. Jacobson
ATTORNEY.

Patented Feb. 8, 1949

2,461,025

UNITED STATES PATENT OFFICE 2,461,025

FIXTURE ACCOMMODATING AND HANGER STUD

Frederick R. Beck, Houston, Tex.

Application October 28, 1944, Serial No. 560,846

5 Claims. (Cl. 248—343)

This invention relates to improvements in stud and nipple equipped means for use in association with conventional outlet boxes such as are used to accommodate and support attaching devices on electric light fixtures suspended from ceilings, walls and the like.

More specifically, the invention has reference to a novel stud or nipple equipped bracket serving as fixture accommodation and adaptation means and expressly devised to promote economy, expediency in handling the parts and to otherwise amply fulfill the requirements of an accessory of this type.

There are on the market, at the present time, several types of fixture studs, internally and externally threaded nipples, so-called crowfeet, and the like, some of which lock in, and some designed for the use of bolts and screws.

This situation necessitates the stocking of two kinds of fixture studs by all electrical contractors in order to be prepared for any sort of installations.

Conventional fixture studs now on the market, especially for concrete work or suspended ceiling work, promote considerable trouble through the method used in securing same to the outlet boxes; namely by bolts and lock nuts. These bolts and lock nuts invariably get loose and let the stud raise out of the box into the concrete, or come off altogether. Further, vibration often loosens the stud completely, necessitating the cutting out of the back of the outlet box and drilling in A. & J. Shield or other devices, to be able to secure a stud for use or in other cases let the stud go back far enough in the concrete to leave only one or two threads sticking out not enough to hang a fixture on securely. This necessitates cutting the back of outlet box out and around the screw parts to get enough threads to be able to insure a secure job when hanging a fixture. This does not happen when my combination self-locking stud is used. This combination self-locking stud is provided for its economy, its lockability and security, and its labor saving costs. This combination self-locking stud using only one operation setting it on a box and striking it a sharp blow with a hammer which locks it in its place from where it cannot move either through vibration or being struck.

In carrying out the principles of the invention I have evolved and produced a simple, practicable and expedient bracket including the nipple or stud and selectively usable cruciform means for connecting the stud to a predetermined area on the top of the conventional outlet box.

Other features and advantages will become more readily apparent from the following description and the accompanying illustrative drawings.

In the drawings, wherein like numerals are employed to designate like parts throughout the same:

Figure 1:
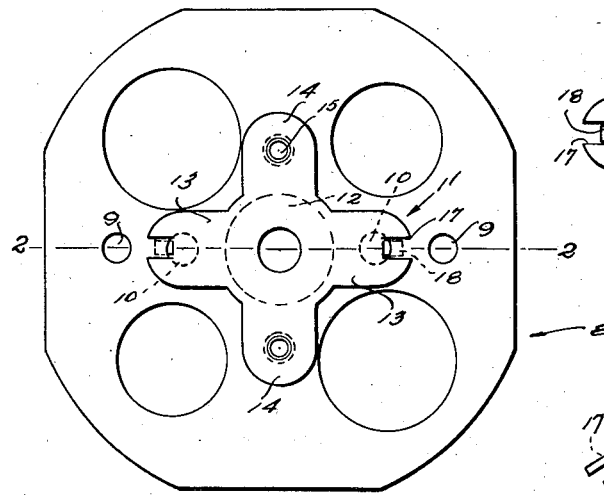
Figure 1 is a top plan view of a conventional outlet box with the stud-bracket anchored on the top thereof.
Figure 4:
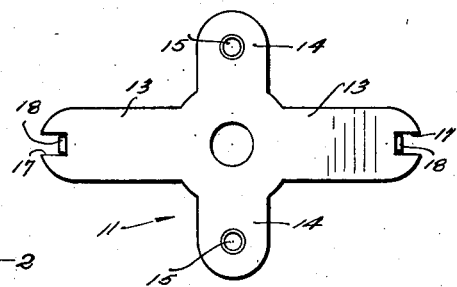
Figure 4 is a top plan view of the stud-bracket per se.

Referring now to the drawings by distinguishing reference numerals, it will be seen that the conventional outlet box is denoted by the numeral 8. This is the type of box used in ceilings, the same having a stud or nipple for hanging electric fixtures, and the like. It is provided in the top with a row of keeper holes, the outer ones of which are denoted by the numerals 9 and the innner ones by the numerals 10 (see Figure 2).

The improved appliance or attachment comprises two parts and is generally denoted by the numeral 11. One part is the cruciform adapter bracket, and the other, the nipple or stud. These are sometimes referred to generally and broadly as nipples, and in other instances as studs. In any event, the stud 12 is conventional and protrudes down through the usual central opening in the top of the outlet box to serve as an accommodation hanger for the electric fixture. In the instant case, it is internally and externally screw threaded and forms integral with the hub portion of the cruciform adapter bracket. The latter comprises a pair of relatively long arms 13 in alignment with each other and shorter arms 14 at right angles thereto. The rams 14 are provided with apertures 15 to accommodate attaching screws as shown in the modification in Figure 7, the screws being indicated at 16. The outer ends of the longer arms 13 are notched as at 17 to form spaced prongs. Stuck down and occurring between the prongs and of general L-shaped form are the hooked detents 18, these constituting keepers and being engageable with the keeper holes 9.

Figure 5:
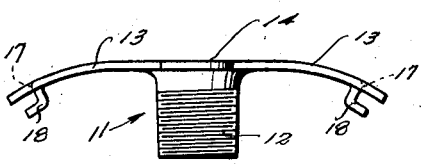
Figure 5 is an edge elevational view of the same.
Figure 2:
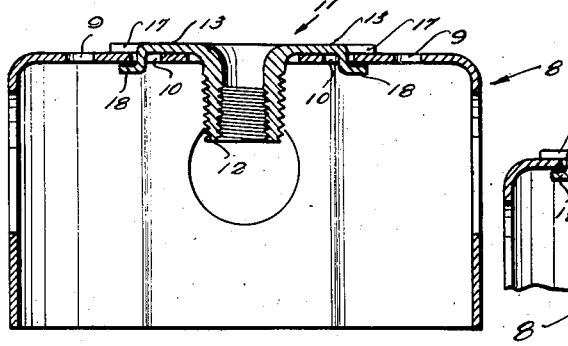
Figure 2 is a section taken approximately on the plane of the line 2—2 of Figure 1.
Figure 6:
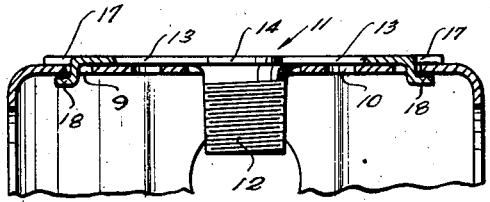
Figure 6 is a view like Figure 2 showing an oversized bracket with the stud and certain other parts appearing in elevation.
Figure 3:
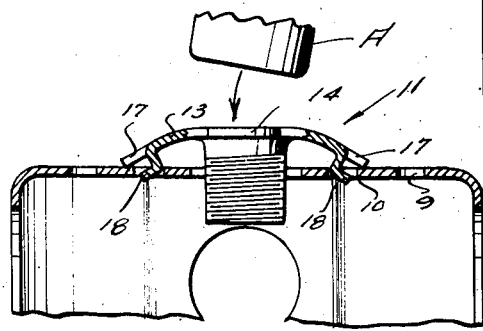
Figure 3 is a view showing the manner in which a hammer, or the like, is used to drive the cruciform bracket home and to anchor same on the outlet box.

As seen in Figures 3 and 5, the longer arms 13 with the keeper hooks are longitudinally bowed and of suitable resiliency. The shorter arms 14 are straight, that is, at right angles to the axis of the stud. Due to the curvature of the arms 13 the adapter bracket is applied as shown in Figure 3 and upon striking the hammer (A), or other implements there against after having inserted the keeper hooks in the keeper holes, the arms straighten out and wedge the hooks securely in place. Hence, the adapter bracket anchors itself on the cap or top of the outlet box 8, as shown in Figures 2 and 6. It is possible to make the arms sufficiently long to engage in the outer holes 9 or sufficiently short to engage in the holes 10, whichever is desired.

Figure 7:
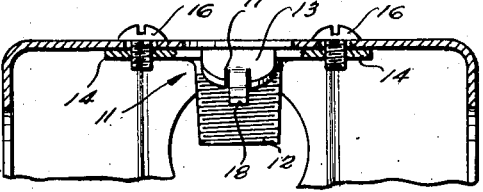
Figure 7 is a view similar to Figures 2 and 6 showing the convertible or interchangeable character of the stud-bracket.

In the form of the invention seen in Figure 7, the adapter bracket is placed on the inside of the outlet box and screwed in place as at 16. The arms 14 serve to permit this alternate or conversion result to be attained.

The so-called conventional stud requires practically 3 operations; namely, (1) knocking out opening, (2) taking off lock nut and inserting stud, and (3) putting lock nut back in place, taking up several minutes of time.

My improved combination self-locking stud can be installed in about 5 seconds. There is nothing to take apart or put together again, simple fasten outlet box to support and pinch in opening with the combination self-locking stud itself when placed in position, and there is nothing to get loose. It is tight.

Further, my combination self-locking stud is also created for economy; namely, electrical contractors will only have to carry one type of stud in stock, as this combination self-locking stud can be used in both concrete work and also for open type work where it is necessary to use screws inside of box, as well as on the outside. Therefore there is no necessity of carrying two types of fixture studs.

The principal advantages are:
1. Appreciable labor costs are saved in installation procedure.
2. There is a saving of costs of material carried in stock due to the fact that only one style of stud-bracket has to be carried.
3. Quick and easy installation requires no bolts, no lock nuts, and affords security.
4. Assured security of combination self-locking stud after installation, as it practically "welds" itself to the box. There is no looseness, no give and above all a full thread to hang fixtures on.
5. There is no need to carry several kinds of studs in store stock.
6. Its adaptability to either concrete or wood or plaster construction is also a factor worthy of note.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a structural assemblage of the class described, in combination, a conventional outlet box having a stud hole centrally arranged in its top and a plurality of keeper holes coordinated therewith, an internally and externally screw-threaded stud projecting into the box by way of said stud hole, said stud being provided on its outer end with an adapter bracket, the adapter bracket being in turn provided with radial arms having L-shaped keeper-hooks insertable and anchored in said keeper holes.

2. As a new article of manufacture an attachment for an outlet box constituting a hanger stud for electric fixtures, and the like, comprising a screw threaded nipple having at its outer end diametrically arranged integral arms, said arms being provided at their free ends with notches, providing sustaining prongs and L-shaped and laterally offset keeper-hooks, the latter being in alignment with said notches.

3. An attachment for an outlet box comprising an internally and externally screw threaded nipple and an adapter bracket connected to the outer end thereof, said adapter bracket being of cruciform design, and embodying opposed pairs of simultaneously usable arms, the arms of one pair being provided with apertures to accommodate fastening screws, and the arms of the remaining pair having their outer ends notched, said arms being longitudinally bowed and the outer ends being provided with substantially L-shaped detents in alignment with the notches and constituting keeper-hooks.

4. As a new article of manufacture, an attachment for an outlet box constituting a hanger stud for electric fixtures, and the like, comprising a screw-threaded nipple having at its outer end diametrically arranged integral arms, said arms being provided at their free ends with notches providing sustaining prongs and L-shaped and laterally offset keeper-hooks, the latter being in alignment with said notches, said arms being longitudinally bowed and adapted to be hammered into rectilinearly straight form when in use to facilitate the steps of initially applying and attaching the arms to an outlet box.

5. As a new article of manufacture, an attachment for an outlet box comprising a tubular hanger stud to accommodate electric fixtures, said stud being internally and externally screw threaded, said stud being provided at its outer end with integral laterally disposed arms diametrically opposite to each other, said arms being longitudinally bowed, having their outer ends bifurcated to provide notches and to simultaneously provide pairs of outstanding retaining and stabilizing prongs, and intervening L-shaped hooks, the hooks being laterally offset in relation to the body portions of the arms.

FREDERICK R. BECK.

REFERENCES CITED

The following references are of record in the file of this patent:

UNITED STATES PATENTS

| Number | Name | Date |
|---|---|---|
| 1,512,038 | Price | Oct. 21, 1924 |
| 1,528,583 | Streed | Mar. 3, 1925 |
| 1,622,087 | Calderwood | Mar. 22, 1927 |
| 1,777,291 | Clayton | Oct. 7, 1930 |
| 1,798,838 | Garvin | Mar. 31, 1931 |
| 1,881,998 | Buchanan | Oct. 11, 1932 |
| 2,178,168 | Gibson | Oct. 31, 1939 |